Aug. 9, 1966

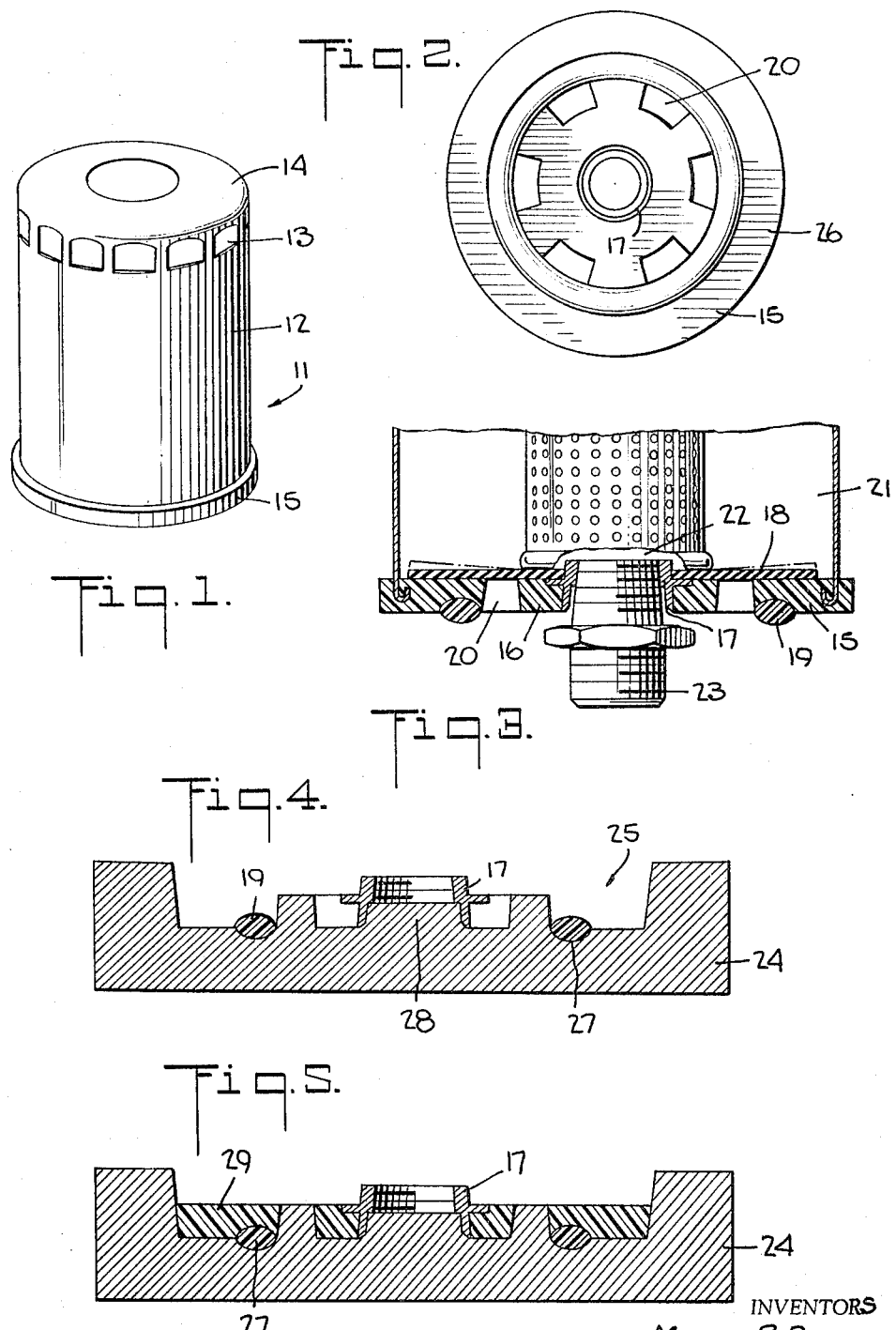

M. R. DECKER ETAL 3,265,213

FILTER ASSEMBLY HAVING THE ENCLOSURE
EMBEDDED IN THE BOTTOM MEMBER

Filed Sept. 18, 1963

INVENTORS
MILTON R. DECKER
JOHN L. KUKOWSKI

BY

Kenyon & Kenyon

ATTORNEYS

United States Patent Office 3,265,213
Patented August 9, 1966

3,265,213
FILTER ASSEMBLY HAVING THE ENCLOSURE EMBEDDED IN THE BOTTOM MEMBER
Milton R. Decker, Denville, and John L. Kukowski, Fanwood, N.J., assignors to Purolator Products, Inc., Rahway, N.J., a corporation of Delaware
Filed Sept. 18, 1963, Ser. No. 309,710
6 Claims. (Cl. 210—136)

This invention relates to a filter assembly, and more particularly to a throw-away oil filter having a molded plastic bottom plate and gasket.

Conventional methods of manufacturing throw-away oil filters for automotive use and the like require the involved steps of stamping out of metal cover plate, fabrication of a machine threaded bushing, assembly of the bushing to the plate by flaring and pressing, provision of a separate sealing gasket for sealing the filter to the motor block which gasket must be mechanically held in place, provision of a separate anti-drainback valve mechanically held in place, and joining of the cover assembly to the can enclosure by a mechanical spinning operation. The above manufacturing methods are time consuming and costly and materially increase the cost and selling price of the final product.

It is an object of the present invention to provide a novel molded plastic cover plate for a throw-away filter or the like which is relatively simple to manufacture and which reduces the component parts of the cover assembly from three parts to essentially one part.

Another object is to provide a throw-away filter in which corrosion problems of the cover plate are eliminated, material costs are reduced, the cover assembly weighing 20-25% less than prior metal cover assemblies, adhesive bonding of the plastic cover assembly to the metal container is simultaneous with the formation of the cover assembly, machining operations are reduced to a single step, manufacturing time is reduced and manufacturing methods are greatly simplified, and greater versatility of application is effected in the finished product. Briefly the present invention involves a throw-away oil filter which includes an inner filter element, an outer closure member or can being open at one end, a plastic composite bottom member closing said end having the bottom edge portion of said closure embedded therein to form a fluid and pressure tight seal therewith, said bottom member comprised of an epoxy resin having an average molecular weight of about 350–400 and a durometer hardness of the cured resin of about 105–110 on the Rockwell "M" scale, and gasketing means integrally formed in said bottom member comprised of at least one resin selected from the group consisting of urethane and epoxy resins having an average molecular weight of 350–400 and a Shore A durometer hardness of about 75 in the cured state.

The bottom member includes a centrally disposed bushing member communicating with the outlet side of said filter and is adapted for interconnection with an automotive crankcase oil system. Filter inlet port members are provided in said bottom member and are disposed radially outwardly from said bushing and communicate with the inlet side of said filter. Peripheral gasketing means is integrally cast in said bottom radially outwardly from the inlet port members for sealing said bottom against an engine block or the like and anti-drainback means is integrally cast in said bottom adjacent said inlet port members.

Other objects and features of the invention will become apparent from the following description and claims and in the drawing in which FIG. 1 is a diagrammatic view of a throw-away filter made according to the present invention;

FIG. 2 is a bottom plan view of the filter;

FIG. 3 is an enlarged fragmentary elevation in section;

FIG. 4 is an enlarged sectional view of the cover plate mold;

FIG. 5 is the mold of section 4 including the plastic material;

Figure 6:
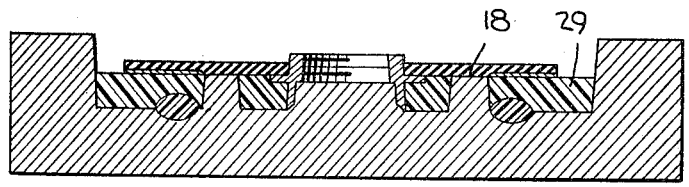
FIG. 6 is the same as FIG. 5 with the anti-drainback element added
Figure 7:
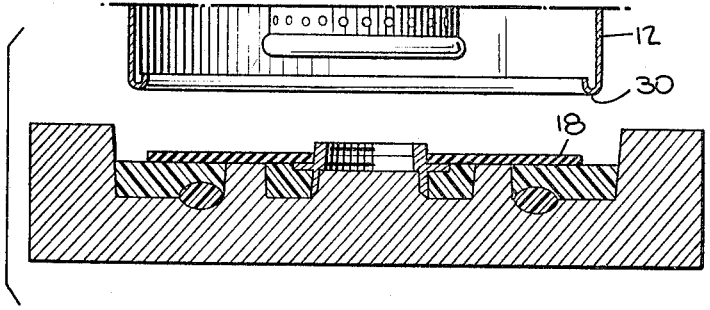
FIG. 7 is an exploded view of the mold with the can bottom ready for insertion.

Referring now to the drawings a throw-away filter is shown in FIG. 1 and designated generally by reference numeral 11. The outer can or enclosure 12 is of conventional design having polygonal indentations 13 near the top or upper end 14 for engagement with a suitable wrench (not shown) for installation or removal of the filter assembly on an engine block (not shown). The novelty of the present invention resides in the bottom or cover plate 15 which is an in situ molded plastic assembly. It includes a main body portion 16 constituted by a cured epoxy resin, a centrally disposed bushing 17 of metal, plastic or any other material of choice, anti-drainback valve diaphragm means 18 and an integrally cast plastic gasketing means 19 of urethane or epoxy resin. Except for the molded plastic cover plate 15 the filter is of conventional design and configuration having a plurality of fluid inlet ports 20 in bottom 15 peripherally disposed at radially spaced positions from central bushing 17 which through anti-drainback diaphragm 18 communicate with the inlet side 21 of the inner filter assembly. Bushing member 17 communicates with the outlet side 22 of the inner filter assembly and is adapted for threaded engagement with conventional threaded plug means 23 to attach it to an engine block or the like (not shown).

The main body 16 of the cover plate 15 is cast from any appropriate moldable plastic material such as an epoxy resin having an average molecular weight of about 350–400 and a durometer hardness of about 105–110 on the Rockwell "M" scale. The epoxide equivalent, which is the grams of resin containing one gram equivalent of epoxide, preferably is from about 185 to about 200. The curing agent may be of any suitable type, for example, metaphenylenediamine having an average molecular weight of 108 and filler and pigment may be added in controlled quantities as required for the desired physical properties of hardness, tensile strength, tear strength, et cetera of the molded cover assembly. The resins may range from an average molecular weight of about 350 to about 1000 and an epoxide equivalent of 170 to 500 gram chemical equivalents of epoxy per gram mol of resin can be used. The epoxy material is reacted with stoichiometrically calculated quantities of curing agent to provide complete consumption of reactive groups in the resins. Catalyst curing agents are usually used in concentrations ranging from 1–10 parts per 100 parts of resin by weight. Crosslinking agents may be present in substantial quantities of about 10 to 100 parts per 100 parts of resin by weight or more. Cure temperatures and cure time will vary with the curing agents used. In the above system a gel time of approximately 30–45 minutes at 100° C. is required with a post cure of two hours at 150° C. to develop maximum resin properties. Epoxy resins of the above type are described in Epoxy Resins, by Henry Lee and Kris Neville, McGraw-Hill (1957).

The method of fabricating the filter assembly of the present invention is diagrammatically represented in FIGS. 4 through 7. A specially designed mold 24 is fabricated out of metal, plastic or other suitable material having a mold cavity 25 with the configuration desired in the bottom face 26 of the cover plate 15. The first step is the pouring of the gasket 19 which is to be located adjacent the fluid inlet ports 20. A mold cavity or annulus 27 is provided and into this is poured urethane or epoxy resin having an average molecular weight of about 350–400 and a Shore A durometer hardness of about 75 in the cured state. The durometer A fifteen second rating (ASTM-676–53T) is 75 plus or minus 3. Bushing 17 which may be of metal or a plastic or other material as desired is placed on the center boss 28 of mold 24 and then the main body of plastic 29 is poured into the mold cavity over sealing gasket 27 (see FIG. 5). The rubber diaphragm 18 is placed on top of the poured plastic 29 (see FIG. 6). Outer can or closure member 12 is then moved into position and its bottom edge 30 embedded in the plastic material 29 (see FIGS. 3 and 7) and the plastic is then cured to provide the bottom having the above described properties.

The outlet port threaded bushing 17 may be threaded metal or plastic bushing or may be formed in the plastic bottom 29 itself if desired. The anti-drainback valve 18 may be formed by either of two methods. One method is as above described, namely by positioning a suitable diaphragm material of rubber or the like over the inlet ports 20 and integrating the diaphragm into the cover assembly by adherence to the plastic material during curing.

Figure 8:
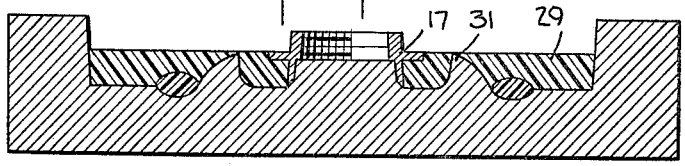
FIG. 8 is a modified form of mold.
Figure 9:
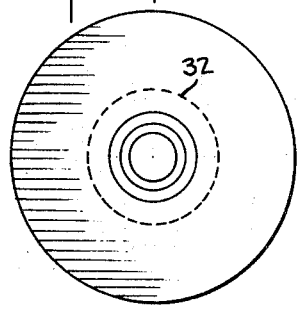
FIG. 9 is a bottom plan view of a modified form of cover plate.
Figure 10:
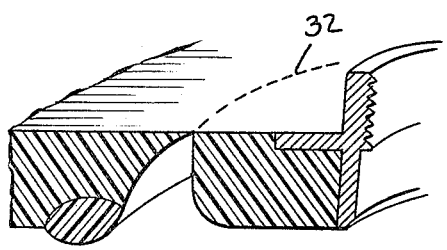
FIG. 10 is an enlarged fragmentary section of the cover plate of FIG. 9.

An alternate embodiment is shown in FIGS. 8–10 wherein the mold cavity is provided with a plurality of pointed ridges 31 which project into the plastic bottom 29 around bushing 17 to provide a series of slots 32 which during use are normally closed but under pressure of the fluid medium can be forced open to admit the fluid into the filter assembly, and upon release of such pressure will again close to form a sealed surface.

The above plastic elements attain their physical and chemical properties when the plastic materials are cured by heat, pressure, and catalyst alone or in any combination as desired. It is to be understood that any type of molding resin having sufficient flow characteristics can be used to form a cover assembly of the indicated design for various filter applications. Also various resin types may be combined to perform separate functions providing the final resin stage is compatible and forms an integral cover assembly. For an automotive oil filter application the resin system must have the following properties:

(1) Average molecular weight of about 350–400 and a durometer hardness of about 105–110 on the Rockwell "M" scale.

(2) Durometer A fifteen second rating of 75 plus or minus 3 for the O ring or gasket seal.

(3) Plasticizer migration negative.

(4) Hot and cold cycle 212 F. to minus 40 F. (ASTM D-756–47T).

(5) Resistant to HD-30 oil at 280° F. for 100 hours with no change in durometer or physical dimensions.

(6) Resistance to other lube oils, diesel oils, hydraulic oils, et cetera.

(7) The cover assembly must withstand pressure up to 300 p.s.i. without leakage or bursting. The mechanical properties must be able to withstand the conditions of use and the adhesive bond to the metal must be sufficient to resist separation or rupture of any kind under operating conditions.

Two separate resin formulations are used as indicated above to serve specific functions in the mold cover assembly. The formulations are compatible but remain separate through the cure cycle except at their interface where they form an integral bond. The main body 29 provides a hard, tough resin when cured, its formulation is determined by the durometer required for the given application. Various thermoplastic and resin combinations can be used, e.g. a urethane formulation can be used for the O ring gasket and an epoxy formulation for the remainder of the cover assembly, or two separate epoxy formulations can be used, one formulated for flexibility and the other for rigidity, strength, oil resistance, etc.

During fabrication, once the mold is filled with plastic material and the metal can containing the filter element assembly is inserted into the mold and heat, pressure and catalyst, alone or combined therewith, are applied to the system, all operations proceed simultaneously to produce a complete filter assembly.

While two embodiments of the invention have been shown and described it is to be understood that certain changes and additions may be made by those skilled in the art without departing from the scope and spirit of the invention.

What is claimed is:

1. An oil filter comprising a filter element with an inlet side and an outlet side, a surrounding closure member having a closed top and an open bottom, an in situ molded plastic composite bottom member having the inner and outer surfaces of the bottom edge portion of said closure member embedded therein to form a fluid and pressure tight seal therewith, said bottom member including a separate bushing member bonded thereto and communicating with the outlet side of said filter and adapted for interconnection of said filter with an automotive crankcase oil system, filter inlet port members in said bottom member communicating with the inlet side of said filter and gasketing means integrally cast in and bonded to the outer surface of said bottom member for sealing said bottom member against an engine block.

2. A throw-away oil filter comprising a filter element with an inlet side and an outlet side, a surrounding closure member having a closed top, a side portion, and an open bottom, said side portion having a bottom edge portion disposed at an angle to said side portion, an in situ molded plastic composite bottom member having the inner and outer surfaces of the bottom edge portion of said closure member embedded therein to form a fluid and pressure tight seal therewith, said bottom member including a centrally disposed bushing member communicating with the outlet side of said filter and adapted for interconnection of said filter with an automotive crankcase oil system, filter inlet port members in said bottom member communicating with the inlet side of said filter, and gasketing means integrally cast in and bonded to the outer surface of said bottom member for sealing said bottom member against an engine block.

3. A throw-away oil filter comprising a filter element with an inlet side and an outlet side, a surrounding closure member having a closed top and an open bottom, an in situ molded plastic composite bottom member having the inner and outer surfaces of the bottom edge portion of said closure member embedded therein to form a fluid and pressure tight seal therewith, said bottom member including a centrally disposed bushing member communicating with the outlet side of said filter and adapted for interconnection of said filter with an automotive crankcase oil system, filter inlet port members in said bottom member disposed radially outwardly from said bushing and communicating with the inlet side of said filter, and gasketing means integrally cast in and bonded to the outer surface of said bottom member for sealing said bottom member against an engine block.

4. A throw-away oil filter comprising a filter element with an inlet and an outlet side, a surrounding closure member having a closed top and an open bottom, an in situ molded plastic composite bottom member having the inner and outer surfaces of the bottom edge portion of said closure member embedded therein to form a fluid and pressure tight seal therewith, said bottom member including a centrally disposed bushing member communicating with the outlet side of said filter and adapted for interconnection of said filter with an automotive crankcase oil system, filter inlet port members in said bottom member disposed radially outwardly from said bushing and communicating with the inlet side of said filter, and peripheral gasketing means integrally cast in and bonded to the outer surface of said bottom member, said gasketing means being disposed radially outwardly from said inlet port members for sealing said bottom member against an engine block.

5. A throw-away oil filter comprising a filter element with an inlet and an outlet side, a surrounding closure member having a closed top and an open bottom, an in situ molded plastic composite bottom member having the inner and outer bottom edge portion of said closure member embedded therein to form a fluid and pressure tight seal therewith, said bottom member including a centrally disposed bushing member communicating with the outlet side of said filter and adapted for interconnection of said filter with an automotive crankcase oil system, filter inlet port members in said bottom member disposed radially outwardly from said bushing and communicating with the inlet side of said filter, and peripheral gasketing means integrally cast in said bottom member radially outwardly from said inlet port members and bonded to the outer surface of said bottom member for sealing said bottom against an engine block, and anti-drainback slot means integrally cast in said bottom member adjacent said inlet port members for preventing a reverse flow of oil through said inlet port members.

6. A throw-away oil filter including an inner filter element, an outer closure member being open at one end, and a plastic composite bottom member closing said end having the bottom edge portion of said closure embedded therein to form a fluid and pressure tight seal therewith, said bottom member comprised of an epoxy resin having an average molecular weight of about 350–400 and a durometer hardness of about 105–110 on the Rockwell "M" scale, and gasketing means integrally formed in said bottom member comprised of at least one resin selected from the group consisting of urethane and epoxy resins having an average molecular weight of about 350–400 and a Shore A durometer hardness of about 75 in the cured state.

References Cited by the Examiner
UNITED STATES PATENTS

| | | | |
|---|---|---|---|
| 3,132,097 | 5/1964 | Tietz | 210—136 X |
| 3,166,498 | 1/1965 | Otto | 210—440 X |
| 3,186,562 | 6/1965 | Cutler | 210—497 X |

REUBEN FRIEDMAN, *Primary Examiner.*

F. SPEAR, *Assistant Examiner.*